US008851722B2

(12) United States Patent
Fedosik et al.

(10) Patent No.: US 8,851,722 B2

(45) Date of Patent: Oct. 7, 2014

(54) HEADLIGHT LENS FOR A VEHICLE HEADLIGHT

(75) Inventors: Dmitry Fedosik, Jena (DE); Wolfram Wintzer, Jena (DE)

(73) Assignee: Docter Optics SE (DE)

( * ) Notice: Subject to any disclaimer, the term of this patent is extended or adjusted under 35 U.S.C. 154(b) by 0 days.

(21) Appl. No.: 13/990,081

(22) PCT Filed: Nov. 11, 2011

(86) PCT No.: PCT/EP2011/005698

§ 371 (c)(1), (2), (4) Date: May 29, 2013

(87) PCT Pub. No.: WO2012/072188

PCT Pub. Date: Jun. 7, 2012

(65) Prior Publication Data

US 2013/0250595 A1 Sep. 26, 2013

(30) Foreign Application Priority Data

Dec. 3, 2010 (DE) ......................... 10 2010 053 185
Feb. 1, 2011 (DE) ......................... 10 2011 009 950
Jul. 11, 2011 (DE) ......................... 10 2011 107 056

(51) Int. Cl.

*B60Q 1/04* (2006.01)
*F21V 7/08* (2006.01)
*F21S 8/10* (2006.01)

(52) U.S. Cl.

CPC ........... *F21S 48/1241* (2013.01); *F21S 48/125* (2013.01); *F21S 48/115* (2013.01); *F21S 48/1275* (2013.01)

USPC ............ 362/511; 362/507; 362/516; 362/545

(58) Field of Classification Search

CPC .............. F21S 48/1154; F21S 48/1159; F21S 48/1241; F21S 48/125; F21S 48/1258; F21S 48/1266; F21S 48/1291; F21S 48/1329

USPC .......................... 362/507, 511, 516, 538, 545

See application file for complete search history.

(56) References Cited

U.S. PATENT DOCUMENTS 5,257,168 A 10/1993 Davenport et al.
5,697,690 A 12/1997 Okuchi et al.
6,709,141 B1 3/2004 Sisti
7,073,931 B2 7/2006 Ishida (Continued)

FOREIGN PATENT DOCUMENTS

DE 1165514 B 9/1964
DE 4121673 A1 1/1993

(Continued)

OTHER PUBLICATIONS

PCT International Search Report completed by the ISA/EP on Feb. 1, 2012 and issued in connection with PCT/EP2011/005698.

(Continued)

*Primary Examiner* — Nimeshkumar Patel
*Assistant Examiner* — Steven Horikoshi
(74) *Attorney, Agent, or Firm* — Barnes & Thornburg LLP

(57) ABSTRACT

Headlight lens for a vehicle headlight having a monolithic body of transparent material, the monolithic body including at least one light entry face, a light passage section and at least one optically operative light exit face.

36 Claims, 8 Drawing Sheets

(56) References Cited

U.S. PATENT DOCUMENTS

| | | | | |
|---|---|---|---|---|
| 8,342,726 | B2 | 1/2013 | Fischer et al. | |
| 2004/0156209 | A1 | 8/2004 | Ishida | |
| 2006/0087860 | A1 | 4/2006 | Ishida | |
| 2007/0147055 | A1 | 6/2007 | Komatsu | |
| 2007/0201241 | A1 | 8/2007 | Komatsu | |
| 2010/0033849 | A1 | 2/2010 | Seki et al. | |
| 2011/0148280 | A1 | 6/2011 | Kishimoto et al. | |
| 2013/0242590 | A1* | 9/2013 | Fedosik et al. ................ | 362/521 |
| 2013/0250597 | A1* | 9/2013 | Fedosik et al. ................ | 362/511 |
| 2013/0258694 | A1* | 10/2013 | Fedosik et al. ................ | 362/511 |
| 2013/0272011 | A1* | 10/2013 | Fedosik et al. ................ | 362/522 |

FOREIGN PATENT DOCUMENTS

| | | | |
|---|---|---|---|
| DE | 4209957 | A1 | 9/1993 |
| DE | 4320554 | A1 | 12/1993 |
| DE | 19526512 | A1 | 1/1996 |
| DE | 19742159 | A1 | 4/1998 |
| DE | 102005011760 | A1 | 9/2006 |
| DE | 102008026626 | A1 | 12/2009 |
| DE | 10252228 | B4 | 1/2010 |
| DE | 102008049168 | A1 | 4/2010 |
| DE | 102009008631 | A1 | 8/2010 |
| EP | 1113216 | A2 | 7/2001 |
| EP | 1357334 | A1 | 10/2003 |
| EP | 1666787 | A1 | 6/2006 |
| EP | 1767398 | A1 | 3/2007 |
| EP | 2113222 | A1 | 11/2009 |
| EP | 2159479 | A2 | 3/2010 |
| EP | 2221219 | A1 | 8/2010 |
| FR | 2860280 | A1 | 9/2004 |
| GB | 2365962 | A | 2/2002 |
| GB | 2399622 | B | 8/2005 |
| GB | 2412159 | A | 9/2005 |
| JP | 2005317226 | | 11/2005 |
| WO | 2009/147070 | A1 | 12/2009 |

OTHER PUBLICATIONS

PCT International Search Report completed by the ISA/EP on Mar. 19, 2012 and issued in connection with PCT/EP2011/005699.

PCT International Search Report completed by the ISA/EP on Feb. 15, 2012 and issued in connection with PCT/EP2011/005700.

PCT International Search Report completed by the ISA/EP on Feb. 1, 2012 and issued in connection with PCT/EP2011/005701.

PCT International Search Report completed by the ISA/EP on May 9, 2012 and issued in connection with PCT/EP2011/005702.

PCT International Search Report completed by the ISA/EP on May 4, 2012 and issued in connection with PCT/EP2011/005703.

International Preliminary Report on Patentability (Chapter I) issued on Jun. 4, 2013 in connection with PCT/EP2011/005698.

International Preliminary Report on Patentability (Chapter I) issued on Jun. 4, 2013 in connection with PCT/EP2011/005699.

International Preliminary Report on Patentability (Chapter I) issued on Jun. 4, 2013 in connection with PCT/EP2011/005700.

International Preliminary Report on Patentability (Chapter I) issued on Jun. 4, 2013 in connection with PCT/EP2011/005701.

International Preliminary Report on Patentability (Chapter I) issued on Jun. 4, 2013 in connection with PCT/EP2011/005702.

International Preliminary Report on Patentability (Chapter I) issued on Jun. 4, 2013 in connection with PCT/EP2011/005703.

* cited by examiner

Fig. 7
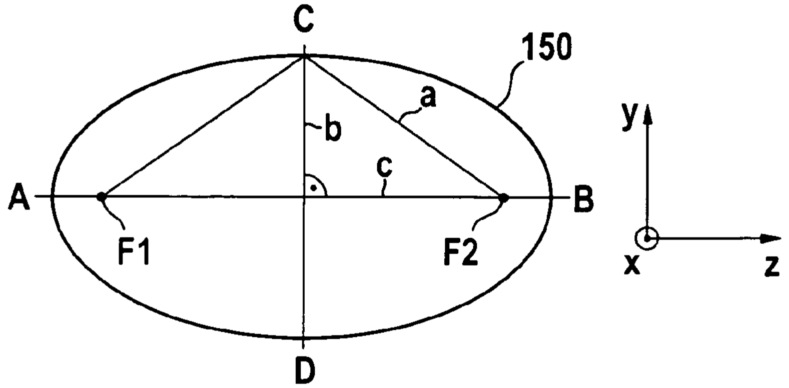
Fig. 8
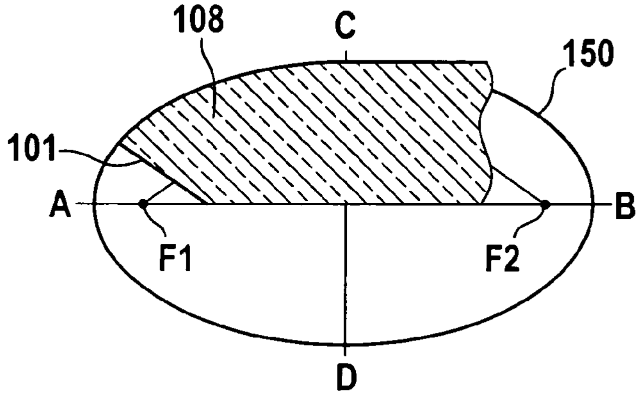
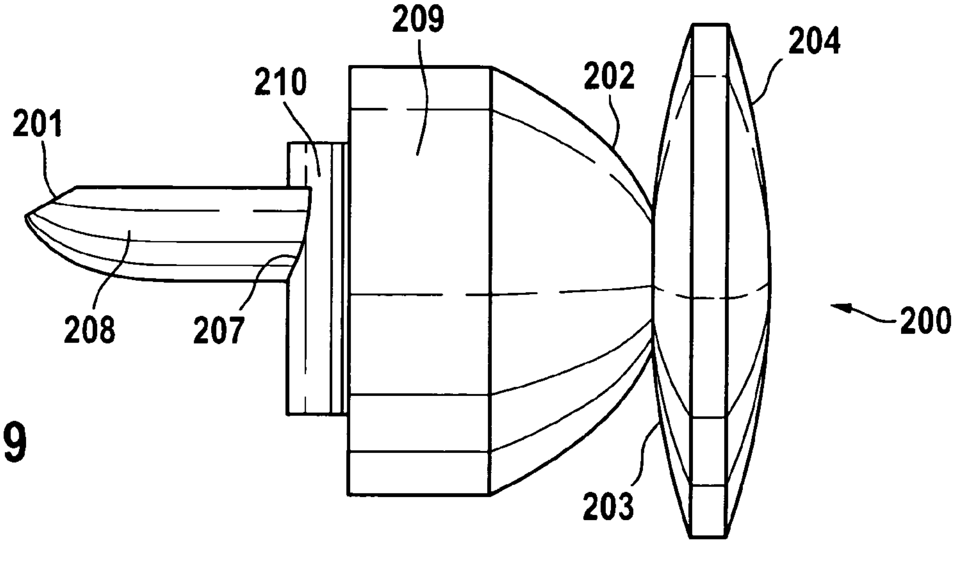
Fig. 9

Fig. 10
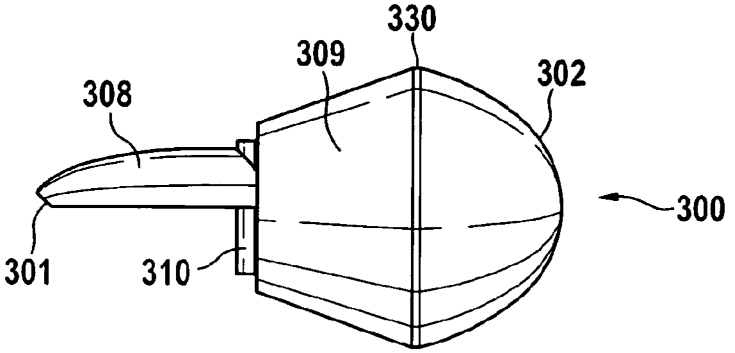
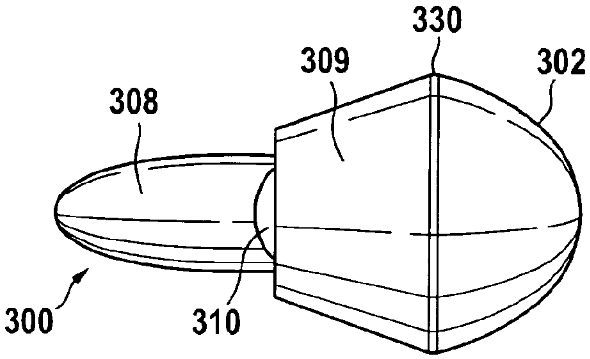
Fig. 11
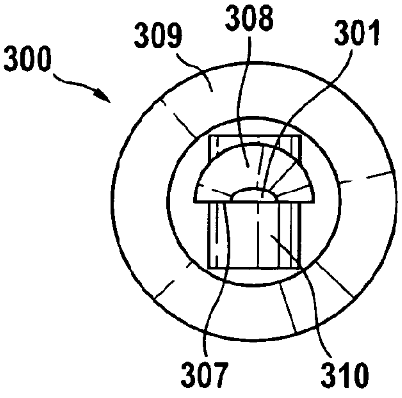
Fig. 12
Fig. 13
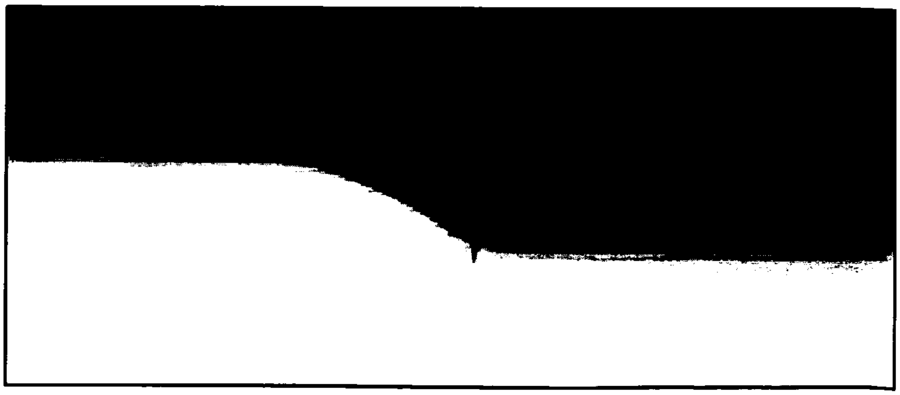

HEADLIGHT LENS FOR A VEHICLE HEADLIGHT

CROSS-REFERENCE TO RELATED APPLICATIONS

This application is the U.S. national phase of PCT/EP2011/005698 filed Nov. 11, 2011. PCT/EP2011/005698 claims the benefit under the Convention of German Patent Application Nos. 10 2010 053 185.5, 10 2011 009 950.6, and 10 2011 107 056.0 filed Dec. 3, 2010, Feb. 1, 2011, and Jul. 11, 2011 (respectively).

FIELD OF THE INVENTION

The invention relates to a headlight lens for a vehicle headlight, in particular for a motor vehicle headlight, wherein the headlight lens includes a monolithic body of transparent material including at least one optically operative (also termed 'effective') light entry face and at least one optically operative (effective) light exit face.

BACKGROUND INFORMATION

DE 203 20 546 U1 discloses a lens blank-molded on both sides and having a curved surface, a planar surface and a retention edge integrally molded onto the lens' edge, wherein a supporting edge of a thickness of at least 0.2 mm and projecting with respect to the planar surface is integrally formed onto the retention edge. Herein, the supporting edge is integrally formed onto the outer circumference of the headlight lens. A further headlight lens having a supporting edge is disclosed e.g. by DE 10 2004 048 500 A1.

DE 20 2004 005 936 U1 discloses a lens for illuminating purposes, in particular a lens for a headlight for imaging or imaging light emitted from a light source and reflected by a reflector for generating a predetermined illumination pattern, said lens having two surfaces opposing each other, wherein areas of different optical dispersion effects are provided on at least a first surface.

DE 103 15 131 A1 discloses a headlight for vehicles having at least one extensive luminous field including a plurality of illuminating element (diode)-chips and an optical element arranged in the light path of the light beam emitted by the luminous field, wherein the illuminating element chips of the luminous field are arranged in a common recess, and that the recess, on a side facing the direction of light emission, has an outer edge which, in relation to the elimination element chips, is spatially arranged such that a predetermined gradient of light density is formed in a light dispersion of the headlight in the area of the outer edges.

DE 10 2004 043 706 A1 discloses an optical system for a motor vehicle headlight for dispersing a beam of light rays from an illuminant, with an optical primary element having an optical face including a break or discontinuity extending along a line, being provided, wherein the optical face is formed to be smooth at least on one side adjacent the discontinuity so that the beam of light rays is separated into two partial beams of light rays. Herein, it is provided that at least one of the partial beams of light rays has a sharp edge of limitation. Moreover, the optical system comprises an optical secondary element for imaging the sharp edge of limitation on to a predetermined light-dark-boundary.

EP 1 357 333 A2 discloses a light source device for a vehicle light which has an element emitting semiconductor light, which element is arranged on an optical axis of the light source device and emits its light essentially in an orthogonal direction with regard to the optical axis.

Further illumination facilities in context with vehicles are disclosed by DE 42 09 957 A1, DE 41 21 673 A1, DE 43 20 554 A1, DE 195 26 512 A1, DE 10 2009 008 631 A1, U.S. Pat. No. 5,257,168 and U.S. Pat. No. 5,697,690.

It is, in particular, an object of the invention to suggest an improved headlight lens for a vehicle headlight, in particular for a motor vehicle headlight. It is a further object of the invention to reduce the costs for manufacturing vehicle headlights.

SUMMARY

The aforementioned object is achieved by a headlight lens for a vehicle headlight, in particular for a motor vehicle headlight, wherein the headlight lens includes a particularly blank-molded monolithic body of transparent material including at least one (in particular optically operative) light entry face and at least one optically operative light exit face, wherein the monolithic body comprises a light tunnel which, via a bend, passes (or transits) into a light passage section (of the monolithic body) for imaging the bend as a light-dark-boundary.

An optically operative or effective light entry (sur)face or an optically operative or effective light exit (sur)face are (constituted by) an optically operative or effective surface of the monolithic body. In the sense of the invention, an optically operative surface is, in particular, a surface of the transparent body, at which surface light will be refracted, when using the headlight lens according to its purpose. In the sense of the invention an optically operative surface is. in particular, a surface at which the direction of light which passes through this surface will be changed when using the headlight lens according to its purpose.

In the sense of the invention, transparent material is particularly glass. In the sense of the invention, transparent material is particularly inorganic glass. In the sense of the invention, transparent material is particularly silicate glass. In the sense of the invention, transparent material is particularly glass as described in document PCT/EP2008/010136. In the sense of the invention, glass particularly comprises 0.2 to 2% by weight $Al_2O_3$
0.1 to 1% by weight $Li_2O$,
0.3 (in particular 0.4) to 1.5% by weight $Sb_2O_3$
60 to 75% by weight $SiO_2$,
3 to 12% by weight $Na_2O$,
3 to 12% by weight $K_2O$, and
3 to 12% by weight CaO.

In the sense of the invention, the term blank-molding is, in particular, to be understood in a manner that an optically operative surface is to be molded under pressure such that any subsequent finishing or post-treatment of the contour of this optically operative surface may be dispensed with or does not apply or will not have to be provided for, respectively. Consequently, it is particularly provided for that, after blank-molding, a blank-molded surface is not ground, i.e. it need not be treated by grinding.

In the sense of the invention a light tunnel is, in particular, characterized in that essentially total reflection takes place at its lateral (in particular top, bottom, right and/or left) surfaces, so that light entering the light entry face is guided through the tunnel as a light conductor or guide. In the sense of the invention a light tunnel is in particular a light guide or light conductor. In particular, it is provided for that total reflection is achieved at the longitudinal surfaces of the light tunnel. In particular, it is provided for that the longitudinal surfaces of the light tunnel are adapted for total reflection. In particular, it is provided for that total reflection is achieved at the surfaces of the light tunnel essentially oriented in the direction of the optical axis of the light tunnel. In particular, it is provided for that the surfaces of the light tunnel essentially oriented in the direction of the optical axis of the light tunnel are adapted for total reflection. A light tunnel, in the sense of the invention, in particular tapers in the direction of its light entry face. A light tunnel, in the sense of the invention, in particular tapers in the direction towards its light entry face by at least 3°. A light tunnel, in the sense of the invention, in particular tapers in the direction towards its light entry face by at least 3° with respect to its optical axis. A light tunnel, in the sense of the invention, in particular tapers at least partially in the direction towards its light entry face. A light tunnel, in the sense of the invention, in particular tapers at least partially in the direction towards its light entry face by at least 3°. A light tunnel, in the sense of the invention, in particular tapers at least partially in the direction towards its light entry face by at least 3° with respect to its optical axis.

A bend, in the sense of the invention, is, in particular, a curved transition. A bend, in the sense of the invention, is, in particular, a curved transition having a radius of curvature of no less than 50 nm. It is, in particular, provided for that the surface of the headlight lens has no break or discontinuity in the bend, but rather a curve or curvature. It is, in particular, provided for that the surface of the headlight lens in the bend has a curvature, in particular with a radius of curvature of the curve in the bend of no less than 50 nm. In an embodiment the radius of curvature is no larger than 5 mm. In an expedient embodiment the radius of curvature is no more than 0.25 mm, in particular no more than 0.15 mm, in particular no more than 0.1 mm. In another embodiment of the invention the radius of curvature of the curve in the bend is at least 0.05 mm. It is, in particular, provided for that the surface of the headlight lens is blank-molded in the region of the bend.

In another embodiment of the invention the light tunnel is arranged between the bend and the light entry face. In another embodiment of the invention the light passage section is arranged between the bend and the light exit face. In particular, it is provided that light, which enters the transparent body through the light entry face and enters the passage section in the area of the bend of the light tunnel will exit from the light exit face at an angle of between −20° and 20° with regard to the optical axis. In particular, it is provided for that light which enters the transparent body through the light entry face will exit from the light exit face at an angle of between −20° and 20° with regard to the optical axis. In particular, it is provided for that light which enters the transparent body through the light entry face and enters the passage section in the area of the bend of the light tunnel will exit from the light exit face essentially in parallel to the optical axis. It is, in particular, provided for that light, which enters the transparent body from the light entry face will exit from the light exit face essentially in parallel to the optical axis.

In another embodiment of the invention the bend includes an opening angle of at least 90°. In a further expedient embodiment of the invention the bend includes an opening angle of no more than 150°. In another embodiment of the invention the bend is arranged on the surface of the light passage section, which surface is facing the light entry face.

In another embodiment of the invention the orthogonal of the light entry face is inclined with respect to the optical axis of the light passage section. In a further expedient embodiment of the invention the light entry face is inclined with respect to the optical axis of the light passage section at an angle of between 5° and 70°, in particular at an angle of between 20° and 50°.

In another embodiment of the invention the light tunnel comprises an area on its surface which corresponds essentially to a part of the surface of an ellipsoid. In a further expedient embodiment of the invention the light tunnel comprises an area on its surface which corresponds essentially to at least 15% of the surface of an ellipsoid.

In another embodiment of the invention the light tunnel comprises a region on its surface, for which the following applies:

$$0.75\cdot a\cdot\sqrt{1-\frac{y^2}{b^2}-\frac{z^2}{c^2}}\leq x\leq 1.25\cdot a\cdot\sqrt{1-\frac{y^2}{b^2}-\frac{z^2}{c^2}}$$

$$0.75\cdot b\cdot\sqrt{1-\frac{x^2}{a^2}-\frac{z^2}{c^2}}\leq y\leq 1.25\cdot b\cdot\sqrt{1-\frac{x^2}{a^2}-\frac{z^2}{c^2}}$$

wherein there is z a coordinate in the direction (of the optical axis) of the light tunnel;

x a coordinate orthogonal to the direction of the optical axis of the light tunnel;

y a coordinate orthogonal to the direction of the optical axis of the light tunnel;

a a number having a value exceeding (greater than) 0;

b a number having a value exceeding (greater than) 0; and c a number having a value exceeding (greater than) 0.

In another embodiment of the invention a surface of the light passage section facing the light tunnel is curved at least in the region of the bend into the transition into the light tunnel, the curvature being, in particular, convex. In another embodiment of the invention the bend is curved in its longitudinal extension. In another embodiment of the invention the bend is curved, in its longitudinal extension, the curvature having a radius of curvature of between 5 mm and 100 mm. In another embodiment of the invention the bend is curved, in its longitudinal extension, according to a Petzval curvature (also termed Petzval surface).

In a further expedient embodiment of the invention the bend, in its longitudinal extension, comprises a curvature having a radius of curvature in the orientation of the optical axis of the light tunnel and/or of the light passage section. In a yet further preferred embodiment of the invention the radius of curvature is orientated opposite to the light exit face.

In another embodiment of the invention the bend is curved in a first direction and in a second direction. In a further expedient embodiment of the invention the first direction is orthogonal to the second direction. In another embodiment of the invention the bend is curved with a first radius of curvature in a first direction and with a second radius of curvature in a second direction, wherein the second radius of curvature is positioned orthogonal to the first radius of curvature.

In another embodiment a portion of the surface of the passage section facing the light tunnel is designed as a Petzval surface. In another embodiment of the invention the surface of the light passage section facing the light tunnel is, in a region in which it transits into the light tunnel, designed as a Petzval surface.

In another embodiment of the invention the length of the headlight lens, when viewed in the orientation of the optical axis of the light tunnel and/or the light passage section amounts to no more than 7 cm.

In another embodiment of the invention the headlight lens or the transparent body has a further light exit face as well as a further light entry face. In a further expedient embodiment of the invention at least 20% of the light entering the light entry face and exiting through the light exit face will exit through the light exit face after having exited from the monolithic body through the further light exit face and having entered into the monolithic body through the further light entry face. In another embodiment of the invention at least 10%, in particular at least 20% of the light entering the light entry face and exiting through the light exit face will exit through the light exit face without having exited from the monolithic body through the further light exit face and without having entered the monolithic body through the further light entry face. In a yet further expedient embodiment of the invention at least 75% of the light entering the light entry face and exiting through the light exit face will exit through the light exit face after having exited from the monolithic body through the further light exit face and having entered the monolithic body through the further light entry face. In another embodiment of the invention it is provided for that light which enters the transparent body through the light entry face and enters the passage section from the light tunnel in the region of the bend will either exit from the monolithic body through the further light exit face and enter the further light entry face of the monolithic body as well as it will exit from the monolithic body from the light exit face, or it will exit directly from the light exit face (without exiting from the further light exit face from the monolithic body and without entering the further light entry face of the monolithic body).

The aforementioned object is, moreover, achieved by a vehicle headlight, in particular a motor vehicle headlight, wherein the vehicle headlight has a headlight lens—including in particular one or several of the aforementioned features—as well as a light source for introducing (remark by translator: also termed 'launching' or 'coupling') light into or making it enter the first light entry face. In an embodiment of the invention the light source comprises at least one LED or an array of LED's. In an expedient embodiment of the invention the light source comprises at least one OLED or an array of OLED's. For example the light source may as well be a plane luminous field. The light source may also comprise light element chips as have been disclosed by DE 103 15 131 A1. A light source may also be a laser. A laser to be used has been disclosed in ISAL 2011 Proceedings, page 271ff.

In a further expedient embodiment of the invention the vehicle headlight has no secondary optic associated with the headlight lens. A secondary optic, in the sense of the invention, is in particular an optical device for aligning light which exits from the light exit face or from the last light exit face of the headlight lens, respectively. A secondary optic, in the sense of the invention, is in particular an optical element for aligning light separated from and/or subordinated with regard to the headlight lens. A secondary optic, in the sense of the invention is, in particular, no cover or protection disc, but an optical element provided for aligning light. As an example for a secondary optic there is disclosed e.g. a secondary lens in DE 10 2004 043 706 A1.

In particular, there is provided that the bend which is mapped as light-dark-boundary lies in the lower region of the light tunnel.

In another embodiment of the invention the distance of the light source from the centre of the light exit face, when seen in the orientation of the optical axis of the light tunnel and/or the light passage section, amounts to no more than 10 cm. In another embodiment of the invention the length of the vehicle headlight, when seen in the orientation of the optical axis of the light tunnel and/or the light passage section, amounts to no more than 10 cm.

There may be provided one or several further light sources whose light is made to enter or is irradiated into the passage section and/or a part of the light tunnel for implementing sign light, country or drive light and/or curve light. When making such additional light enter the light tunnel there is, in particular, provided that this occurs in that half of the light tunnel which is closer to the light passage section and/or in which the light entry face is not provided for.

The aforementioned object is moreover achieved by a headlight lens—comprising in particular one or several of the aforementioned features—for a vehicle headlight, in particular for a motor vehicle headlight, wherein the headlight lens includes a particularly blank-molded monolithic body of transparent material and including an optically operative (effective) first light entry face for making light enter a first light tunnel section; at least one, in particular optically operative second light entry face for making light enter a second light tunnel section; and at least one optically operative light exit face, wherein the monolithic body comprises a light tunnel into which the first light tunnel section and the second light tunnel section open out, wherein the light tunnel, via a bend, passes over (or 'transits') into a light passage section for imaging the bend as a bright-dark-boundary.

In another embodiment of the invention the orthogonal of the first light entry face is inclined with respect to the optical axis of the light conductive section. In a further expedient embodiment of the invention the first light entry face is inclined with respect to the optical axis of the light passage section at an angle of between 5° and 70°, in particular at an angle of between 20° and 50°. In another embodiment of the invention the orthogonal of the second light entry face is inclined with respect to the optical axis of the light passage section. In a further expedient embodiment of the invention the second light entry face is inclined with respect to the optical axis of the light passage section at an angle of between 5° and 70°, in particular at an angle of between 20° and 50°.

In another embodiment of the invention the first light tunnel section in comprises an area on its surface which corresponds essentially to a part of the surface of an ellipsoid. In a further expedient embodiment of the invention the first light tunnel section comprises an area on its surface which corresponds essentially to at least 20% of the surface of an ellipsoid. In another embodiment of the invention the second light tunnel section comprises an area on its surface corresponding essentially to part of an ellipsoid surface. In a further expedient embodiment the second light tunnel section comprises an area on its surface corresponding essentially to at least 20% of an ellipsoid surface.

In another embodiment of the invention the light tunnel comprises a region on its surface, for which the following applies:

$$0.75\cdot a\cdot\sqrt{1-\frac{y^2}{b^2}-\frac{z^2}{c^2}}\leq x\leq 1.25\cdot a\cdot\sqrt{1-\frac{y^2}{b^2}-\frac{z^2}{c^2}}$$

$$0.75\cdot b\cdot\sqrt{1-\frac{x^2}{a^2}-\frac{z^2}{c^2}}\leq y\leq 1.25\cdot b\cdot\sqrt{1-\frac{x^2}{a^2}-\frac{z^2}{c^2}},$$

in which z is a coordinate in the direction (of the optical axis) of the light tunnel;

x is a coordinate orthogonal to the direction of the optical axis of the light tunnel;

y is a coordinate orthogonal to the direction of the optical axis of the light tunnel;

a is a number having a value greater than 0;

b is a number having a value greater than 0; and c is a number having a value greater than 0.

The aforementioned object is moreover achieved by a vehicle headlight, in particular a motor vehicle headlight, wherein the vehicle headlight has a headlight lens—including in particular one or several of the aforementioned features—as well as a first light source for introducing light into the first light entry face and at least a second light source for introducing light into the second light entry face. In an embodiment of the invention the first and/or the second light sources include at least one LED or an array of LEDs. In an expedient embodiment of the invention the first and/or the second light sources comprise at least one OLED or an array of OLEDs. For example, the first and/or the second light sources may well be a plane luminous field. The first and/or the second light sources may also include light element chips as have been disclosed by DE 103 15 131 A1.

In a further expedient embodiment of the invention the vehicle headlight has no secondary optic associated with the headlight lens. A secondary optic, in the sense of the invention, is in particular an optical device for aligning light which exits from the light exit face or from the last light exit face of the headlight lens, respectively. A secondary optic, in the sense of the invention, is in particular an optical element for aligning light separated from and/or subordinated with regard to the headlight lens. A secondary optic, in the sense of the invention, is, in particular, no cover disc or protection plate, but an optical element provided for aligning light. As an example for a secondary optic there is disclosed e.g. a secondary lens in DE 10 2004 043 706 A1.

In particular, there is provided that the bend which is mapped as light-dark-boundary lies in the lower region of the light tunnel.

In another embodiment of the invention the distance of the first and/or of the second light sources from the centre of the light exit face, when seen in the orientation of the optical axis of the light tunnel and/or the light passage section, amounts to no more than 10 cm. In another embodiment of the invention the length of the vehicle headlight, when seen in the orientation of the optical axis of the light tunnel and/or the light passage section, amounts to no more than 10 cm.

There may be provided one or several further light sources whose light is made to enter or is irradiated into the passage section and/or a part of the light tunnel for implementing sign light, country or drive light and/or curve light. When making such additional light enter the light tunnel there is, in particular, provided that this occurs in that half of the light tunnel which is closer to the light passage section and/or in which the light entry face is not located.

In another embodiment of the invention the light source and the (first) light entry face are designed and associated with each other such that light from the light source enters the light entry face at a luminous flux density of at least 75 $lm/mm^2$.

The aforementioned headlight lenses may be manufactured by means of a process in which the monolithic body is blank-molded between a first partial mold and at least one second partial mold such

- that a first region of the first light entry face is formed by means of the first partial mold and a second region of the first light entry face is molded by means of the second partial mold;
- that a first region of the first light exit face is formed by means of the first partial mold and a second region of the first light exit face is formed by means of the second partial mold;
- that a first region of the second light entry face is formed by means of the first partial mold and a second region of the second light entry face is formed by means of the second partial mold and/or
- that a first region of the second light exit face is formed by means of the first partial mold and a second region of the second light exit face is formed by means of the second partial mold.

In pressing, it is particularly provided for that the first partial mold and the second partial mold are moved to approach each other. Herein, the first partial mold may be made to approach the second partial mold and/or the second partial mold can be made to approach the first partial mold.

Alternatively, the aforementioned headlight lenses may be manufactured by means of a common injection molding procedure. Furthermore, the aforementioned optical components or headlight lenses, respectively, may alternatively be manufactured by means of a procedure disclosed in DE 11 2008 003 157, wherein it is, in particular, provided for that a blank of glass is heated such that it assumes a viscosity of between $10^4$ Pa*s and $10^5$ Pa*s, in particular of between $10^4$ Pa*s and $5\cdot10^4$ Pa*s, and wherein the blank is press-molded after heating in an injection pressure mold to press-form a headlight lens.

It may be provided for that a light entry face in the sense of the invention and/or a light exit face in the sense of the invention has a light dispersing structure. A light dispersing structure, in the sense of the invention, may, for example, be a structure as has been disclosed in DE 10 2005 009 556 A1 and in EP 1 514 148 A1 or EP 1 514 148 B1, respectively. It may be provided for that a light tunnel, in the sense of the invention, is coated. It may be provided for that a light tunnel, in the sense of the invention, is coated with a reflective coating or layer. It may be provided for that a light tunnel, in the sense of the invention, is provided with a reflective coating.

In the sense of the invention, a motor vehicle is, in particular, a land vehicle to be used individually in road traffic. In the sense of the invention, motor vehicles are, in particular, not restricted to land vehicles including a combustion engine.

BRIEF DESCRIPTION OF THE DRAWINGS

FIG. 7 shows an example of embodiment for an ellipsoid;

FIG. 8 shows a cross sectional representation of the ellipsoid according to FIG. 7 with a superimposed representation of a portion of the light tunnel represented in FIG. 6;

FIG. 9 shows a side view of an example of embodiment of a headlight lens for alternative use in the headlight lens according to FIG. 2;

FIG. 10 shows a side view of a further example of embodiment of a headlight lens for alternative use in the motor vehicle headlight according to FIG. 2;

FIG. 11 shows a top view of the headlight lens according to FIG. 10;

FIG. 12 shows a rear view of the headlight lens according to FIG. 10;

FIG. 13 shows a bright-dark-boundary generated by means of the headlight lens according to FIG. 10;

DETAILED DESCRIPTION

Figure 1:
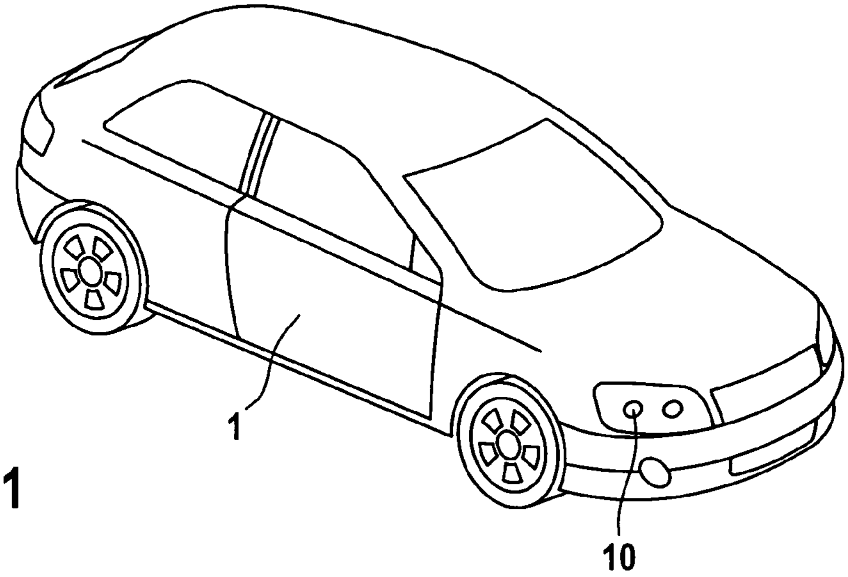
FIG. 1 shows an example of an embodiment of a motor vehicle.
Figure 2:
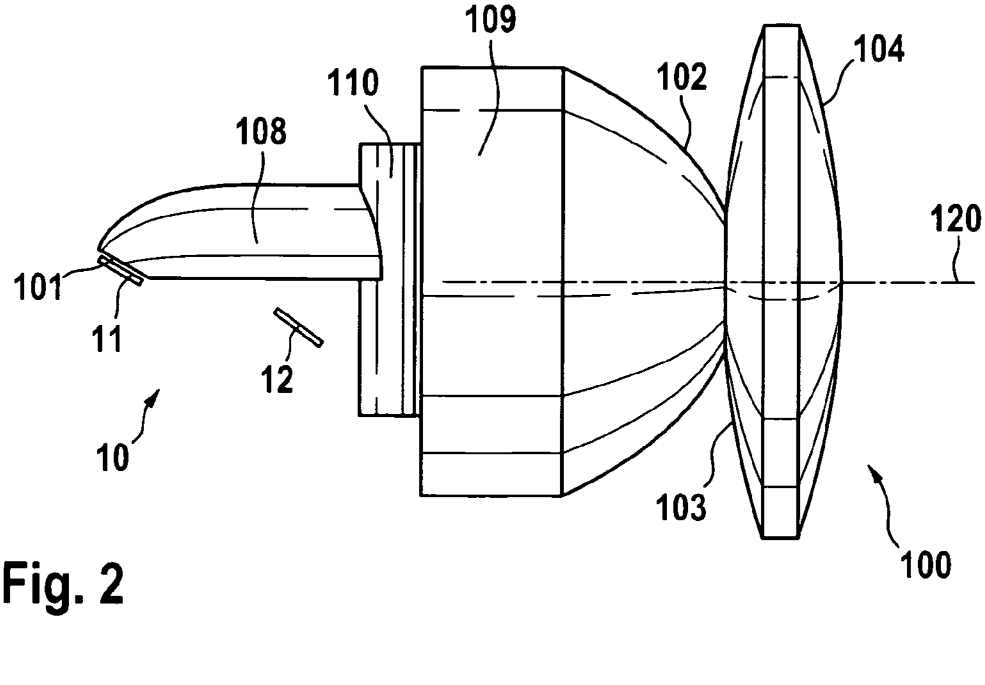
FIG. 2 shows an example of an embodiment of a headlight lens for use in the motor vehicle according to FIG. 1.
Figure 3:
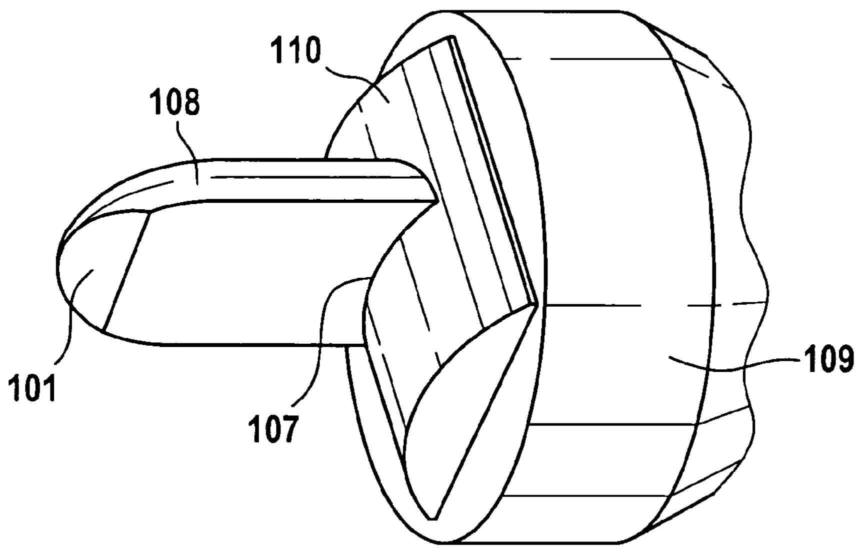
FIG. 3 shows a cut-out representation of a headlight lens of the motor vehicle headlight lens according to FIG. 2 by way of a perspective view from below.

FIG. 1 shows an example of embodiment of a motor vehicle 1 including a motor vehicle headlight 10. FIG. 2 shows a side view of the motor vehicle headlight 10 having a headlight lens 100, but without a housing, fittings and energy supply, with the headlight lens 100 being represented in FIG. 3 in a cut-out manner by way of a perspective bottom view (view from below). The headlight lens 100 comprises a blank-molded monolithic body of inorganic glass, in particular glass, which comprises 0.2 to 2% by weight $Al_2O_3$, 0.1 to 1% by weight $Li_2O$, 0.3 (in particular 0.4) to 1.5% by weight $Sb_2O_3$, 60 to 75% by weight $SiO_2$, 3 to 12% by weight $Na_2O$, 3 to 12% by weight $K_2O$, and 3 to 12% by weight CaO.

The blank-molded monolithic body comprises a light tunnel 108, which, on its one side, has a light entry face 101 and, on another side, passes (or transits) into a light passage (guide or conductive) section 109 (of the blank-molded monolithic body) via a bend 107 curved in two spatial directions, which section 109 has a light exit face 102, a light entry face 103 as well as a further light exit face 104. The headlight lens 100 is designed such that light entering the headlight lens 100 through the light entry face 101 and, in the region of the bend 107, entering the passage section from the light tunnel 108 will exit from the light exit face 104 essentially in parallel to the optical axis 120 of the headlight lens 100. Herein, the light passage section 109 maps the bend 107 as a light (or bright)/dark-boundary. A portion of the surface of the light passage section 109 facing the light tunnel 108 is designed as a Petzval surface, said surface portion having been designated by reference numeral 110.

The headlight lens 10 includes a light source 11 designed as an LED and a light source 12 designed as an LED. For the purpose of implementing dimmed headlights light is irradiated into or made to enter, respectively, the light entry face 101 of the light tunnel 108 by means of the light source 11. By means of light source 12, which may be switched-on selectively for implementing a sign light or a drive/flash light, light is, respectively, introduced or irradiated into a bottom side of the light tunnel 108 or into the portion 110 of the surface of the light passage section 109 facing the light tunnel 108, which portion 110 is designed as a Petzval surface.

Figure 4:
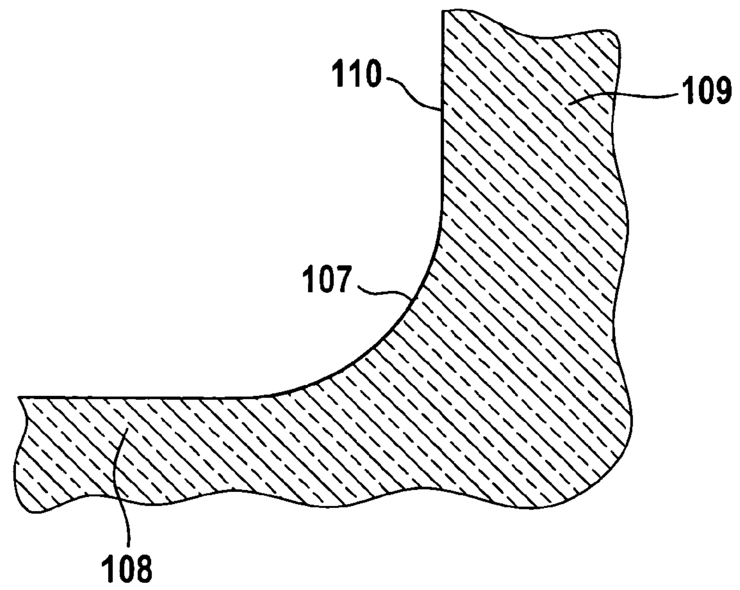
FIG. 4 shows an enlarged representation of a cut-out cross section of a bend for the transition of a light tunnel into a passage section of a headlight lens according to FIG. 3.

FIG. 4 shows, by way of an enlarged representation, a cut-out of the bend 107 for transitory passing of the light tunnel 108 into the light passage section 109, the bend 107 being formed by blank-molding and designed as a continuous, curved transition.

Figure 5:
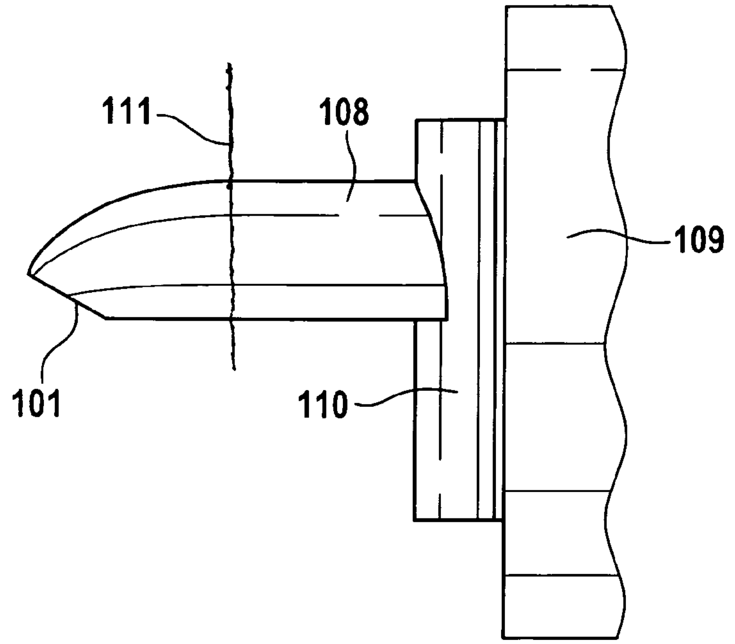
FIG. 5 shows a side view of a cut-out representation of a headlight lens according to FIG. 3.
Figure 6:
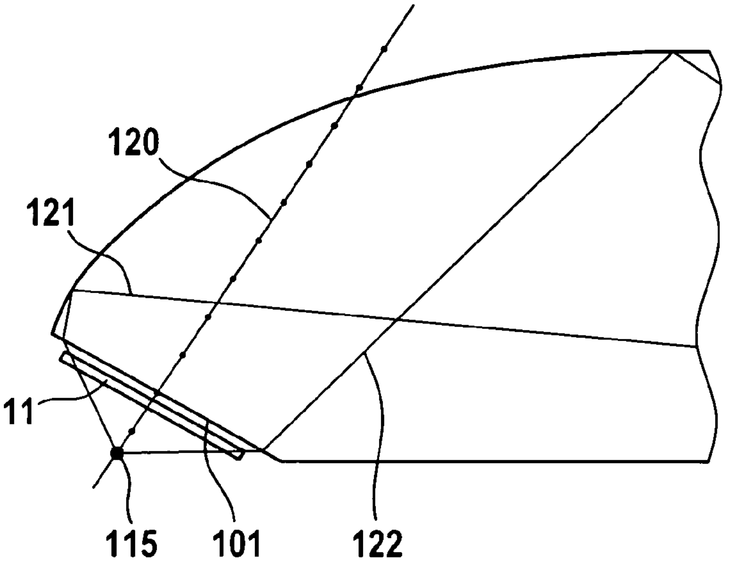
FIG. 6 shows a side view of a cut-out representation of a light tunnel of headlight lens of FIG. 3.

FIG. 5 shows a cut-out representation of a side view of the headlight lens 100. FIG. 6 shows an enlarged cut-out representation of a part of the light tunnel 108 up to the dotted line in FIG. 5 designated by reference numeral 111. The upper portion of the part of the light tunnel as shown in FIG. 6 has been designed as an ellipsoid 150 as represented in FIG. 7. Herein, the dotted line 111 approximately corresponds to the axis C-D. For clarifying this embodiment, a part of the cross section of the light tunnel 108 in FIG. 8 is shown in a manner overlaying the representation of the ellipsoid 150. For the ellipsoid 150 represented in FIG. 7 the following applies:

$$\frac{x^2}{a^2}+\frac{y^2}{b^2}+\frac{z^2}{c^2}-1=0$$

Herein, there is z a coordinate in the direction of the optical axis of the light tunnel (A→B);

x a coordinate orthogonal to the direction of the optical axis of the light tunnel; and y a coordinate orthogonal to the direction of the optical axis of the light tunnel and to the x-direction (D→C).

a, b and, consequently, c have been chosen such that all light beams or rays which pass through focus F1 will concentrate again in focus F2 after mirroring in the surface of the ellipsoid. The course of the beams of light from the light source 11, which is irradiated into or made to enter the light entry face 101 is illustrated by the light beams 121 and 122 depicted in FIG. 6. Reference numeral 120 of FIG. 6 designates the orthogonal of the light entry face 101. The mutual point of intersection of orthogonal 120 of the light entry face 101 with the light beams 121 and 122 has been designated by reference numeral 115. The position of this point of intersection 115 corresponds to focus F1 in FIG. 7 and FIG. 8.

FIG. 9 shows a side elevation of a headlight lens 200 in its intended alignment (within a motor vehicle headlight), which lens 200 is to be used alternatively with regard to headlight lens 100. The headlight lens 200 comprises a blank-molded monolithic body of inorganic glass and including a light tunnel 208, which has a light entry face 201 on one side and, on another side, transits into a light passage or conductive section 209 (of the blank-molded monolithic body) via a bend 207 curved in three spatial dimensions, which light conductive section 209 includes a light exit face 202, a light entry face 203, as well as a further light exit face 204. The headlight lens 200 is shaped such that (all) light, which enters the headlight lens 200 through the light entry face 201, and from the light tunnel 208 enters the passage section in the region of the bend 207, will exit from the light exit face 204 essentially parallel to the optical axis of the headlight lens 200. Herein, the light passage section 209 maps the bend 207 as a light-dark-boundary. A portion of the surface of the light passage section 209 designated by reference numeral 210 and facing the light tunnel 208 is shaped as a Petzval surface.

FIG. 10 shows a headlight lens 300 by way of a side elevation in its intended alignment (within a motor vehicle headlight), which lens 300 is to be used alternatively with regard to headlight lens 100. FIG. 11 shows the headlight lens 300 by way of a top new and FIG. 12 shows the headlight lens 300 from the rear. The headlight lens 300 comprises a blank-molded monolithic body of inorganic glass, which body comprises a light tunnel 308, which has a light exit face 301 on one side and, on the other side, passes over into a light passage or conductive section 309 (of the blank-molded monolithic body) via a bend 307 curved in the two spatial dimensions, which light passage section 309 includes a light exit face 302. The headlight lens 300 is shaped such that light which enters the headlight lens 300 through the light entry face 301 and, from the light tunnel 308 enters the passage section in the region of the bend 307 will exit from the light exit face 302 essentially in parallel to the optical axis of the headlight lens 300. Herein, the light passage section 309 maps the bend 307 as a light-dark-boundary, as has been depicted in FIG. 13. A portion of the surface of the light passage section 309 designated by reference numeral 310 and facing the light tunnel 308 is shaped as a Petzval surface. A rim or edge, in particular a circumferential edge, may be provided on the section designated by reference numeral 330 of the surface of the passage section 309, by means of which edge the headlight lens 300 may be fixed in a particularly appropriate manner.

Figure 14:
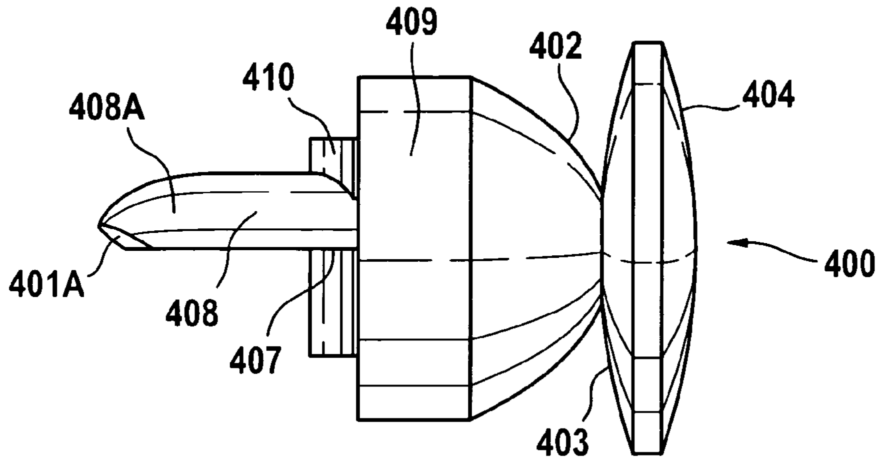
FIG. 14 shows a side view of a further example of embodiment of a headlight lens for alternative use in the motor vehicle headlight according to FIG. 2.
Figure 15:
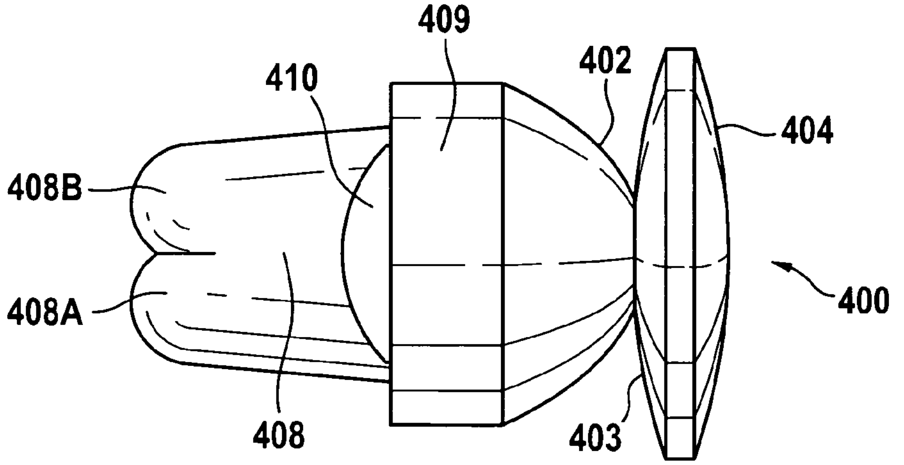
FIG. 15 shows a top view of the headlight lens according to FIG. 14.
Figure 16:
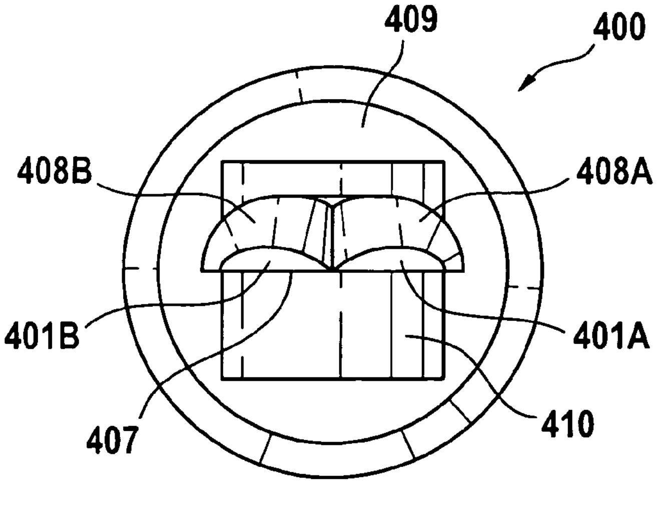
FIG. 16 shows a rear view of the headlight lens according to FIG. 14.

FIG. 14 shows a side elevation of a headlight lens 400 in its intended alignment (within a motor vehicle headlight), which lens 400 is to be used alternatively with regard to headlight lens 100. FIG. 15 shows the headlight lens 400 by way of a top view, and FIG. 16 shows the headlight lens 400 from the rear. The headlight lens 400 comprises a blank-molded monolithic body of inorganic glass, which body includes a light tunnel section 408A and a light tunnel section 408B, which sections open out in(to) a light tunnel 408 which, in turn, transits into a light passage section 409 (of the blank-molded monolithic body) via a bend 407 curved in two spatial directions, which section 409 includes a light exit face 402, a light entry face 403, as well as a further light exit face 404. The light tunnel section 408A includes a light entry face 401A, and the light tunnel section 408B includes a light entry face 401B. The headlight lens 400 is shaped such that light which enters the headlight lens 400 through the light entry faces 401A and 401B and enters the passage section from the light tunnel 408 in the region of the bend 407, will exit from the light exit face 404 essentially in parallel to the optical axis of the headlight lens 400. Herein, the light passage section 409 maps the bend 407 as a bright-dark-boundary. A portion of the surface of the light passage section 409 designated by reference numeral 410 and facing the light tunnel 408 is shaped as a Petzval surface.

Figure 17:
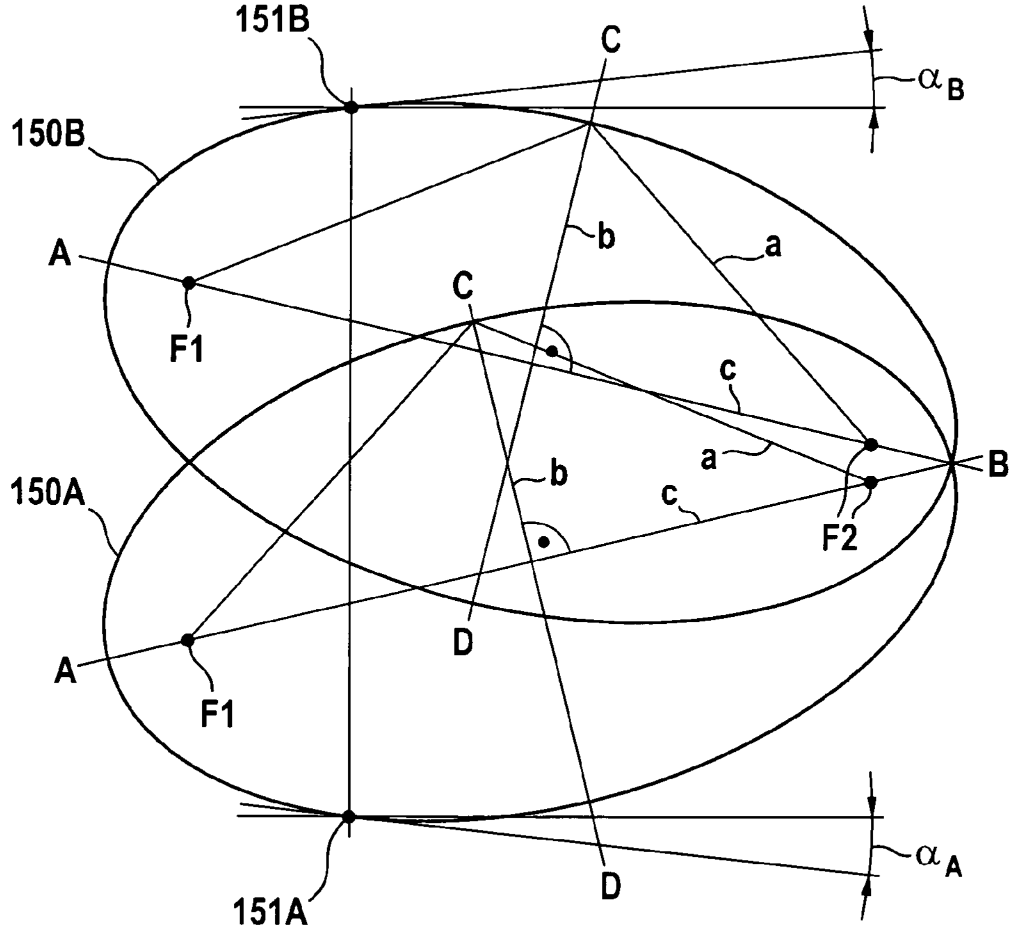
FIG. 17 shows a principle representation of an example of embodiment for superimposing two ellipsoids.

At least in their upper region, the light tunnel sections 408A and 408B are designed—taken in analogy to the explanations relating to FIG. 6—as part of an ellipsoid, as has been represented in principle in FIG. 17. Herein, reference numeral 150A designates an ellipsoid associated with the light tunnel section 408A, and reference numeral 150B designates an ellipsoid associated with the light tunnel section 408B. The ellipsoids 150A and 150B are, as has been represented in FIG. 17, aligned in relation to each other such that the respective focuses F2 will lie on top of each other. At the points designated by reference numerals 151A and 151B or starting at points 151A and 150B, respectively, (in the direction of light propagation or towards the right, respectively), the surface contour of the headlight lens 400 deviates from the contour of an ellipsoid. Herein, the angles $\alpha_A$ and $\alpha_S$ indicate the directions of a deviation from the elliptic shape.

Figure 18:
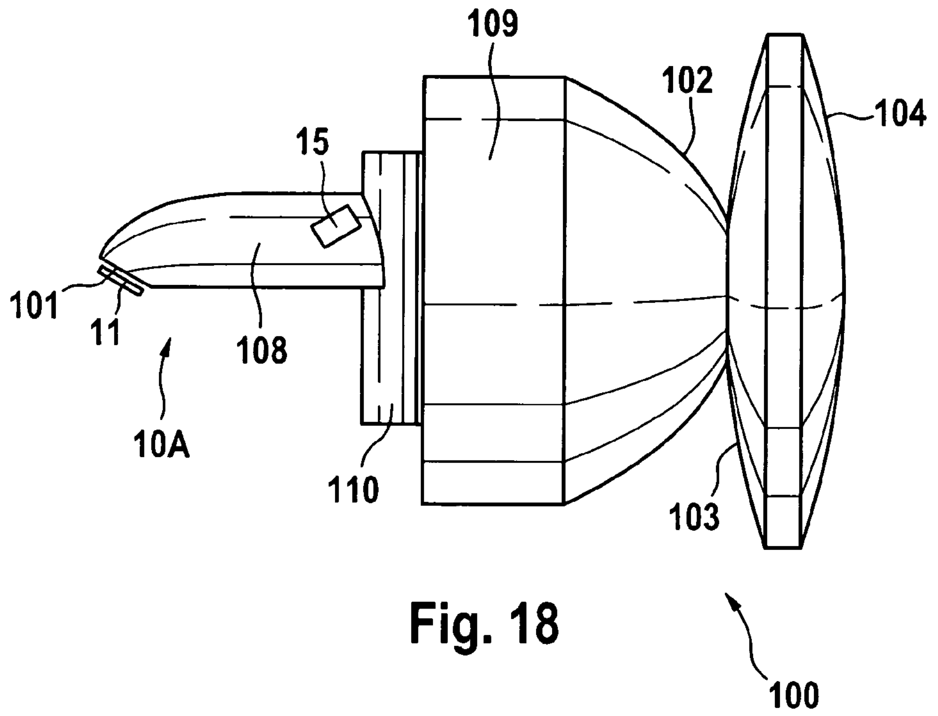
FIG. 18 shows a side view of a further example of embodiment of a motor vehicle headlight for use in the motor vehicle according to FIG. 1.
Figure 19:
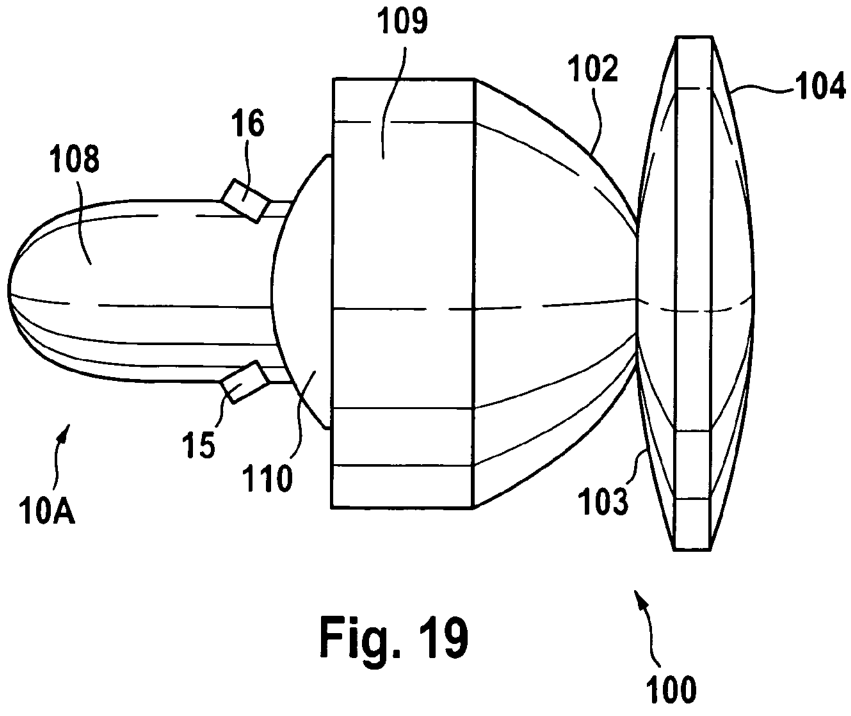
FIG. 19 shows a top view of the motor vehicle headlight according to FIG. 18.

FIG. 18 and FIG. 19 show a motor vehicle headlight 10A to be used alternatively with regard to motor vehicle headlight 10. Herein, FIG. 18 shows a side elevation of the motor vehicle headlight 10A, and FIG. 19 shows a top view of the motor vehicle headlight 10A. The motor vehicle headlight 10A comprises the headlight lens 100 as well as the light source 11. In addition, for implementing a corner or curve light and/or a front fog light, light sources 15 and 16 designed as LED have been provided. It may as well be provided for that in addition the light source 12 is implemented within the motor vehicle headlight 10A.

For implementing a corner light the light sources 15 and 16 may be switched on alternatively. In this context, a non-shown control is provided for in the motor vehicle 1, by means of which the light source 15 may be switched-on for the time of driving round a left corner and light source 16 may be switched-on for the time of driving round a right corner. For implementing a front fog light either the light source 16, only, or both light sources 15 and 16 are switched-on.

The elements, distances and angles in the figures have been drawn in consideration of simplicity and clearness and not necessarily to scale. Thus, for example, the orders of magnitude of some elements, distances and angles have been exaggerated with respect to other elements, distances and angles in order to improve comprehension of the example of embodiment of the present invention.

The invention claimed is:

1. Headlight lens for a vehicle headlight, the headlight lens having:

a monolithic body of transparent material, the monolithic body including a light passage section;

at least one optically operative light entry face inclined with respect to an optical axis of the light passage section at an angle of between 5° and 70°;

at least one optically operative light exit face;

a light tunnel passing over into the light passage section via a bend; and the light passage section being configured for imaging the bend as a light-dark-boundary.

2. The headlight lens of claim 1, wherein the light entry face is inclined with respect to the optical axis of the light passage section at an angle of between 20° and 50°.

3. The headlight lens of claim 1, wherein the light tunnel comprises a region on its surface which corresponds essentially to a part of the surface of an ellipsoid.

4. The headlight lens of claim 1, wherein the light tunnel comprises a region on its surface, for which the following applies:

$$0.75\cdot a\cdot\sqrt{1-\frac{y^2}{b^2}-\frac{z^2}{c^2}}\le x\le 1.25\cdot a\cdot\sqrt{1-\frac{y^2}{b^2}-\frac{z^2}{c^2}}$$

$$0.75\cdot b\cdot\sqrt{1-\frac{x^2}{a^2}-\frac{z^2}{c^2}}\le y\le 1.25\cdot b\cdot\sqrt{1-\frac{x^2}{a^2}-\frac{z^2}{c^2}},$$

in which z is a coordinate in the direction (of the optical axis) of the light tunnel;

x is a coordinate orthogonal to the direction of the optical axis of the light tunnel;

y is a coordinate orthogonal to the direction of the optical axis of the light tunnel and to the x-direction;

a is a number having a value greater than 0;

b is a number having a value greater than 0; and c is a number having a value greater than 0.

5. The headlight lens of claim 1, wherein a surface of the light passage section facing the light tunnel is curved at least in the region of the bend.

6. The headlight lens of claim 1, wherein a surface of the light passage section facing the light tunnel is curved convexly at least in the region of the bend.

7. The headlight lens of claim 1, wherein bend is curved in its longitudinal extension.

8. The headlight lens of claim 1, wherein the bend, in its longitudinal extension, comprises a curvature having a radius of curvature in the orientation of the optical axis of the light passage section.

9. The headlight lens of claim 1, wherein the bend, in its longitudinal extension, comprises a curvature having a radius of curvature in the orientation of an optical axis of the light tunnel.

10. The headlight lens of claim 9, wherein the radius of curvature is orientated opposite to the light exit face.

11. The headlight lens of claim 1, wherein the length of the headlight lens, when viewed in the orientation of the optical axis of the light passage section amounts to no more than 7 cm.

12. The headlight lens of claim 1, wherein the bend is curved in a first direction and in a second direction.

13. The headlight lens of claim 12, wherein the first direction is orthogonal to the second direction.

14. Headlight lens for a vehicle headlight, the headlight lens having:

a monolithic body of transparent material, the monolithic body including a light passage section;

at least one optically operative light entry face inclined with respect to an optical axis of the light passage section;

at least one optically operative light exit face;

a light tunnel passing over into the light passage section via a bend; and the light passage section being configured for imaging the bend as a light-dark-boundary, wherein a surface of the light passage section facing the light tunnel is curved convexly at least in the region of the bend.

15. The headlight lens of claim 14, wherein the light entry face is inclined with respect to the optical axis of the light passage section at an angle of between 20° and 50°.

16. The headlight lens of claim 14, wherein the light tunnel comprises a region on its surface which corresponds essentially to a part of the surface of an ellipsoid.

17. The headlight lens of claim 14, wherein the light tunnel comprises a region on its surface, for which the following applies:

$$0.75 \cdot a \cdot \sqrt{1 - \frac{y^2}{b^2} - \frac{z^2}{c^2}} \leq x \leq 1.25 \cdot a \cdot \sqrt{1 - \frac{y^2}{b^2} - \frac{z^2}{c^2}}$$

$$0.75 \cdot b \cdot \sqrt{1 - \frac{x^2}{a^2} - \frac{z^2}{c^2}} \leq y \leq 1.25 \cdot b \cdot \sqrt{1 - \frac{x^2}{a^2} - \frac{z^2}{c^2}},$$

in which z is a coordinate in the direction (of the optical axis) of the light tunnel;

x is a coordinate orthogonal to the direction of the optical axis of the light tunnel;

y is a coordinate orthogonal to the direction of the optical axis of the light tunnel and to the x-direction;

a is a number having a value greater than 0;

b is a number having a value greater than 0; and c is a number having a value greater than 0.

18. The headlight lens of claim 14, wherein bend is curved in its longitudinal extension.

19. The headlight lens of claim 14, wherein the bend, in its longitudinal extension, comprises a curvature having a radius of curvature in the orientation of the optical axis of the light passage section.

20. The headlight lens of claim 14, wherein the bend, in its longitudinal extension, comprises a curvature having a radius of curvature in the orientation of an optical axis of the light tunnel.

21. The headlight lens of claim 20, wherein the radius of curvature is orientated opposite to the light exit face.

22. The headlight lens of claim 14, wherein the length of the headlight lens, when viewed in the orientation of the optical axis of the light passage section amounts to no more than 7 cm.

23. The headlight lens of claim 14, wherein the bend is curved in a first direction and in a second direction.

24. The headlight lens of claim 23, wherein the first direction is orthogonal to the second direction.

25. Headlight lens for a vehicle headlight, the headlight lens having:

a monolithic body of transparent material, the monolithic body including a light passage section;

at least one optically operative light entry face inclined with respect to an optical axis of the light passage section;

at least one optically operative light exit face;

a light tunnel passing over into the light passage section via a bend, the light tunnel comprising a region on its surface which corresponds essentially to a part of the surface of an ellipsoid; and the light passage section being configured for imaging the bend as a light-dark-boundary.

26. The headlight lens of claim 25, wherein the light entry face is inclined with respect to the optical axis of the light passage section at an angle of between 20° and 50°.

27. The headlight lens of claim 25, wherein the light tunnel comprises a region on its surface, for which the following applies:

$$0.75 \cdot a \cdot \sqrt{1 - \frac{y^2}{b^2} - \frac{z^2}{c^2}} \leq x \leq 1.25 \cdot a \cdot \sqrt{1 - \frac{y^2}{b^2} - \frac{z^2}{c^2}}$$

$$0.75 \cdot b \cdot \sqrt{1 - \frac{x^2}{a^2} - \frac{z^2}{c^2}} \leq y \leq 1.25 \cdot b \cdot \sqrt{1 - \frac{x^2}{a^2} - \frac{z^2}{c^2}},$$

in which z is a coordinate in the direction (of the optical axis) of the light tunnel;

x is a coordinate orthogonal to the direction of the optical axis of the light tunnel;

y is a coordinate orthogonal to the direction of the optical axis of the light tunnel and to the x-direction;

a is a number having a value greater than 0;

b is a number having a value greater than 0; and c is a number having a value greater than 0.

28. The headlight lens of claim 25, wherein a surface of the light passage section facing the light tunnel is curved at least in the region of the bend.

29. The headlight lens of claim 25, wherein a surface of the light passage section facing the light tunnel is curved convexly at least in the region of the bend.

30. The headlight lens of claim 25, wherein bend is curved in its longitudinal extension.

31. The headlight lens of claim 25, wherein the bend, in its longitudinal extension, comprises a curvature having a radius of curvature in the orientation of the optical axis of the light passage section.

32. The headlight lens of claim 25, wherein the bend, in its longitudinal extension, comprises a curvature having a radius of curvature in the orientation of an optical axis of the light tunnel.

33. The headlight lens of claim 32, wherein the radius of curvature is orientated opposite to the light exit face.

34. The headlight lens of claim 25, wherein the length of the headlight lens, when viewed in the orientation of the optical axis of the light passage section amounts to no more than 7 cm.

35. The headlight lens of claim 25, wherein the bend is curved in a first direction and in a second direction.

36. The headlight lens of claim 35, wherein the first direction is orthogonal to the second direction.

* * * * *